Aug. 4, 1931.                    T. E. MURRAY, JR                    1,816,864
                              WELDING METHOD AND APPARATUS
                           Filed May 29, 1929      3 Sheets-Sheet 1
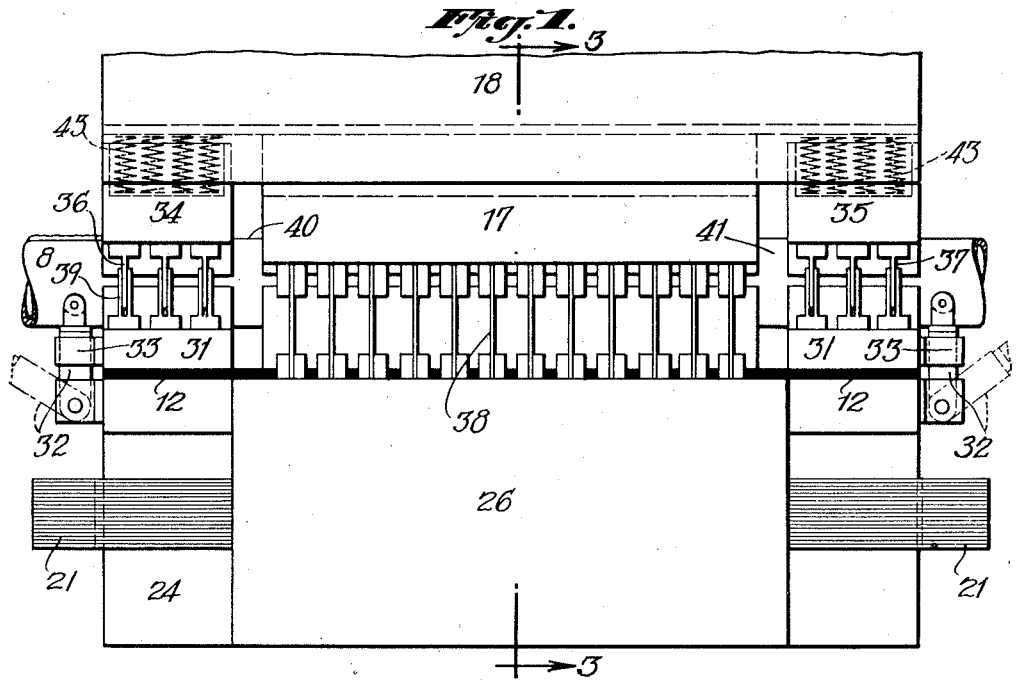
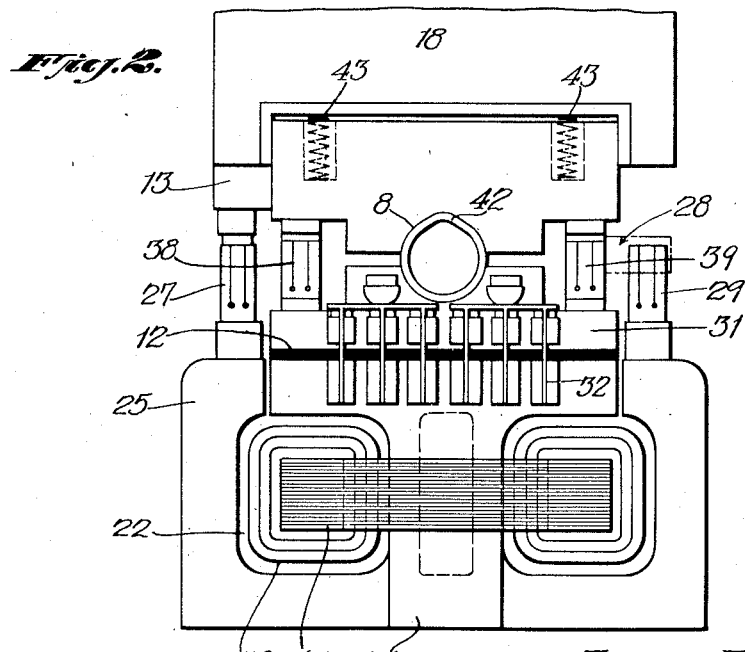
Inventor
THOMAS E. MURRAY Jr.
By His Attorneys

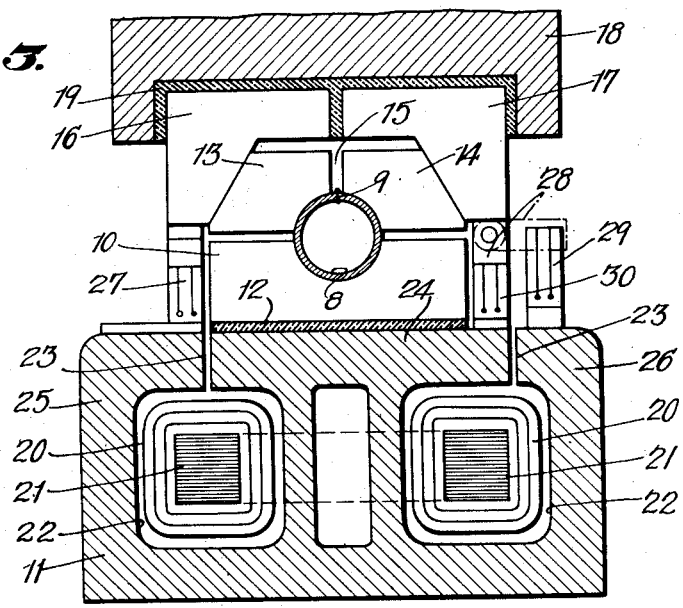
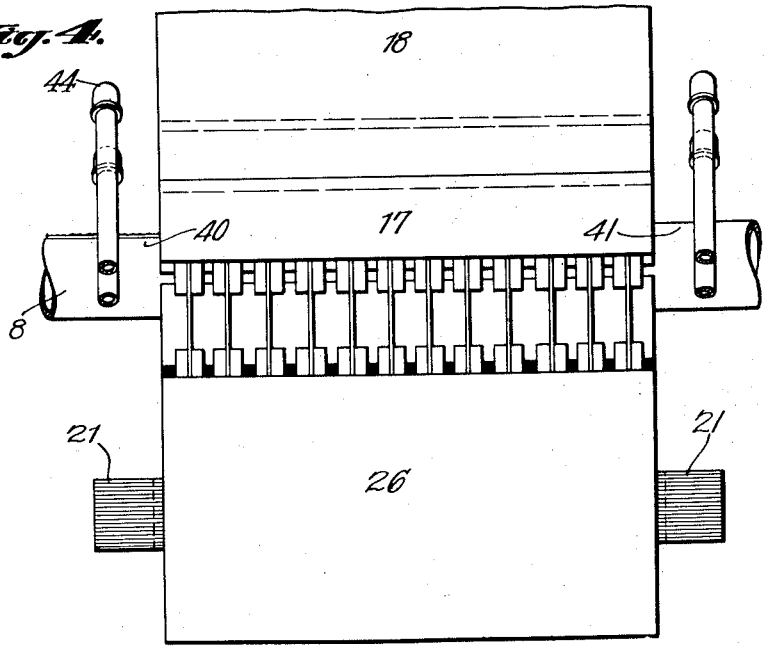

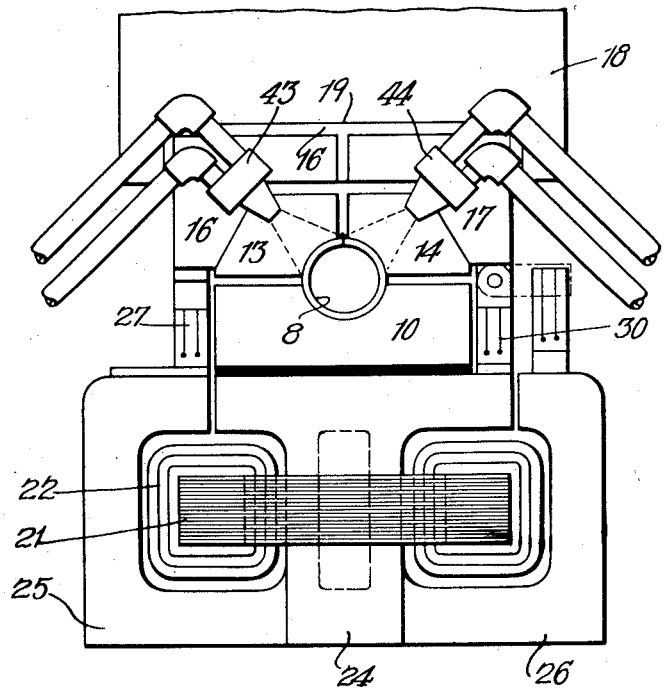

Patented Aug. 4, 1931

1,816,864

UNITED STATES PATENT OFFICE

THOMAS E. MURRAY, JR., OF BROOKLYN, NEW YORK, ASSIGNOR TO METROPOLITAN ENGINEERING COMPANY, A CORPORATION OF NEW YORK

WELDING METHOD AND APPARATUS

Application filed May 29, 1929. Serial No. 366,833.

This invention relates to welding methods and apparatus and more particularly to methods and apparatus for forming an electric butt welded seam of any desired length for hollow articles such as tubes, pipes, etc., or for long sheet metal seams generally.

The electric butt welding of longitudinal seams of pipes, tubes and similar hollow articles, or of metal sheets, plates, etc., heretofore presented the difficulty that in the welding operation there is a take-up of metal which, of necessity, must be accompanied by a decrease in the diameter and circumference of the article being welded which renders it difficult to separately weld a portion of, or anything less than, the entire length of the seam. The welding of the entire length of the longitudinal seam of a pipe or tube of any considerable length would, however, require a very large quantity of current during the welding operation and a very large and expensive welding apparatus.

An object of my present invention is to provide a method and an apparatus by which a longitudinal seam may be welded on limited lengths or sections into a continuous seam and by which a longitudinal electrically butt welded seam may be formed in consecutive lengths or sections without the necessity for transverse welds to close the seam.

Among the objects of the invention are also to provide a welding apparatus for electric butt welding in which the metal adjacent the edges to be welded may be softened by heat at localized intervals to thereby enable the edges of the sheet between these spaced intervals to be pressed together during the welding operation.

With these and other objects in view, the invention comprises the welding methods and apparatus described in the following specification and claims.
The various features of the invention are shown in the accompanying drawings in which—

Fig. 1 is a side view of the welding apparatus embodying a preferred form of the invention.

Fig. 2 is an end elevation taken at right angles to the side elevation of Fig. 1.

Fig. 3 is a vertical section of the apparatus taken on line 3—3 of Fig. 1.

Fig. 4 is a side elevation of a modified form of embodiment of the invention, and Fig. 5 is an end view of the welding apparatus shown in Fig. 4.

In my invention the edges of the sheet or sheets of metal that are to be joined in a seam are placed in electrodes of a length less than that of the seam that is to be formed and held in such a manner that the edges of the sheet or sheets may be pressed together by bending the sheets a short distance from the edges to be welded. The metal adjacent the edges at each end of the electrodes is heated sufficiently to soften the metal and to enable that portion held by the electrodes to be bent without bending or distorting the part of the sheet or object projecting from either end of the electrode. When the length of the seam within the electrodes has been welded, the metal is advanced to bring a succeeding length into the electrode, and the steps of heating the projecting parts adjacent the ends of the electrodes and then welding are repeated. The heating of the metal adjacent the ends of the electrodes may be accomplished in any desired manner, as for example by electric current or by a gas flame.

Referring more particularly to the embodiment of the invention shown in Figs. 1, 2 and 3, in which electric current is used for heating the projecting ends adjacent the electrodes, an elongated sheet or skelp 8 bent to cylindrical form is placed with its adjacent edges 9 uppermost in a semi-circular groove in a tube guide 10 which is mounted on a base 11 and separated therefrom by a layer of insulation 12. The upper half of the cylindrical sheet is received in a semi-cylindrical recess formed by a pair of upper electrodes 13 and 14, one on each side of the abutting edges 9, and separated from each other by a space 15 overlying the edges 9.

The upper electrodes 13 and 14 are held in carriers 16 and 17, respectively, mounted on the lower end of a movable head 18 and insulated therefrom and from each other by a layer of insulation 19. The abutting side faces of the electrode 13 and carrier 16, and of the electrode 14 and carrier 17 are inclined inwardly and upwardly so that as the head 18 and carriers 16 and 17 move downwardly the pressure exerted on the skelp or sheet 8 reacts to force the electrodes 13 and 14 upwardly relative to the carriers 16 and 17 and the electrodes are wedged towards each other, decreasing the space and pressing the edges 9 closely together with the required take-up of metal. The current for welding and for heating the metal of the tubular sheet is supplied by induction from a primary coil 20 wound on a laminated core 21 in recesses 22 in the base 11 in such a manner as to create an alternating electro-motive force in the base 11 around the cross sectional area of the core 21 and recess 22. The circuit for this electro-motive force is interrupted in the base 11 by means of a slot 23 extending upwardly from the recess 22 and thus forming a central pole 24 beneath the insulation 12 and tube guide 10 and a pair of outer poles 25 and 26.

When the head 18 is brought downwardly into operative position the upper carrier 16 is connected to the outer pole 25 by means of leaf switches 27. At the same time the upper carrier 17 may be connected either to the inner pole 24 or outer pole 26 by means of a switch blade 28 pivoted on a lower projection of the electrode 17 in such a manner that it may be swung, as shown in dotted lines in Fig. 3, into contact with an upwardly projecting contact terminal 29 on the outer pole 26 or, as shown in full lines, into contact with an upwardly projecting contact terminal 30 mounted on the inner pole 24.

As shown in Fig. 1, the inner pole 24 projects longitudinally at each end beyond the outer poles 25 and 26. On the upper surfaces of the projecting portions of the inner pole 24 are mounted terminal plates 31, one for each projecting end, and separated from the central pole by the insulation 12. The terminal plates 31 may be electrically connected to the central pole 24 by means of switches 32 pivoted on the projecting portion of the central pole in position to swing into contact with receiving blades 33 on the plates 31 and thereby connect the plates 31 to the central pole.

When the head 18 is brought downwardly into operative position, a pair of end electrodes 34 and 35, working through compression springs 43, spaced from and insulated from the ends of the electrodes 13 and 14 and the carriers 16 and 17 are brought downwardly into contact with the portions of the tubular sheet projecting from the ends of the welding electrodes 13 and 14. When the end electrodes 34 and 35 reach their downward position they are connected to the terminal plates 31 by means of downwardly projecting switch blades 36 and 37 which slide into contact with the upwardly projecting blades 38 and 39, as shown in Figs. 1 and 2.

Accordingly, when the switches 32 are thrown into vertical position connecting the inner pole 24 to the plates 31, the inner pole is connected through the electrodes 34 and 35 to the projecting portions of the tube 8 immediately about the abutting edges 9.

When the switch 28 is in the position shown in broken lines in Fig. 3 and thus connected to the outer pole 26 through the switch blades 29, the current will pass from the outer poles 25 and 26 through the switch 28, carriers 16 and 17, electrodes 13 and 14 and through short lengths 40 and 41 of the tubular article projecting between the electrodes 13 and 14 and the electrodes 34 and 35, and thence to the inner pole 24 through the switches 38 and 39, contact plate 31 and switch 32. In this manner the projecting portions 40 and 41 are heated sufficiently to render the sheet or skelp soft enough to be bent.

The lengths 40 and 41 of the skelp having been heated to sufficient softness, the switch 28 is thrown downwardly into contact with the contacts 30, thereby connecting the electrode 14 and carrier 17 through the switch 28 and contact 30 to the inner pole 24, while the electrode 13 and carrier 16 are connected through the switch 27 to the outer pole 25. Current, therefore, flows from the inner pole to the outer pole through the electrodes 13 and 14 and the edge portion 9 of the skelp between the electrodes 13 and 14, thereby heating these edges to a welding temperature. The head 18 is thereupon lowered, causing the electrodes 13 and 14 to be driven toward each other, compressing the metal edges 9 and thus providing the required take-up.

When the welding operation has been completed, the head 18 is raised, the pipe or skelp is advanced a length equal to the length of the welding electrodes, thus bringing a succeeding length of pipe into the welding electrodes, whereupon the operation is completed and a new length of pipe is welded, the weld being a continuation of the weld previously made and forming a continuous unbroken seam. The form of the weld may be that shown at 42 in end elevation in Fig. 2.

In the form of the invention shown in Figs. 4 and 5, the arrangement and construction of the welding electrodes is similar to that of the modification shown in Figs. 1, 2 and 3, but the end electrodes 34 and 35 and the projection of the central pole or terminal 24 lengthwise of the outer poles 25 and 26 together with their connecting parts are omitted. In place of using these end electrodes and an electric current for heating the pipe or skelp beyond the ends of the welding electrodes, a pair of acetylene torches, or other gas heating burners 43 and 44 are used at each end of the welding electrodes and are so positioned and operated as to direct a flame on the projecting portions 40 and 41 of the skelp.

What I claim is:

1. A method of welding a hollow article on a longitudinal seam which comprises, heating the metal adjacent the edges to be welded at a lengthwise interval, bending said metal toward said seam between said heated portions, and welding said edges in a seam between said heated portions.

2. A method of welding a hollow article on a longitudinal seam which comprises, heating the metal adjacent the edges to be welded at a lengthwise interval, bending said metal between said heated portions toward said edges to bring said edges into abutment, and electrically welding said abutting edges in a seam between said heated portions.

3. A method of welding adjacent edges on a seam which comprises welding a limited length of said seam, heating the edges at one end of said welded length and at a lengthwise distance therefrom, and moving said edges toward each other between said heated portions and welding them together to form a continuation of said seam.

4. A method of welding adjacent edges on a seam which comprises welding a limited length of said seam, heating the edges at one end of said welded length and at a lengthwise distance therefrom, and bringing said edges toward each other between said heated portions and electrically butt welding them together to form a continuation of said seam.

5. A method of welding abutting edges of metal sheets having curved walls adjacent said edges which comprises successively heating to softness the metal adjacent said edges at successively lengthwise spaced localities, and successively butt welding said edges together between said heated localities to form a continuous seam.

6. A method of welding abutting edges of metal sheets having curved walls adjacent said edges which comprises successively heating to softness the metal adjacent said edges at successively lengthwise spaced localities, welding a length of said edges together between a pair of heated localities, bending metal between one of said heated localities and a successively heated locality and electrically butt welding said metal between said localities.

7. A method of welding a sheet or skelp into a hollow or tubular object which comprises successively welding portions of the side edges of said sheet or skelp to form successive lengths of longitudinal seams, and heating said metal adjacent said side edges between said length to be welded and adjacent lengths prior to welding.

8. A method of welding flat metal into hollow bodies which comprises forming said flat metal into a hollow form with edges of said flat metal brought into abutment, heating the metal at said abutment at the ends of a selected length of said abutting edges, and welding said length.

9. A method of electrically butt welding flat metal on a continuous seam which comprises softening the metal adjacent the ends of a selected length of said pipe at said seam by heat, and electrically butt welding the metal between said softening metal.

10. Apparatus for electrically butt welding which comprises upper and lower electrodes of limited length to hold parts to be welded, means for bringing said electrodes toward each other with pressure, means to pass an electric welding current from one electrode to the other through said parts, and means for applying heat at the ends of the said electrodes.

11. Apparatus for electrically butt welding which comprises a pair of welding electrodes means to bring the edge portions of a hollow sheet metal article into abutment under pressure between said electrodes, means to pass an electric welding current from one electrode to the other through the edge portions of said sheet metal, and means for heating said metal to be bent at the ends of said electrode.

12. Apparatus for electrically butt welding which comprises a pair of welding electrodes means for compressing the edge portions of a hollow article into abutment between said electrodes, an electrode spaced from an end of said welding electrodes, and means for connecting a source of electric energy alternatively between said welding electrodes and said spaced electrodes and between the individual electrodes of said pair of welding electrodes.

13. Apparatus of the type described which comprises a pipe guide, a pair of welding electrodes above and spaced from said pipe guide, means for wedging said electrodes toward each other, an electrode spaced longitudinally of the ends of said welding electrodes, means for generating welding currents, and means for connecting opposite poles of said current generator to said welding and spaced electrodes or alternatively to opposite welding electrodes.

14. Apparatus of the type described which comprises a pipe guide, a pair of welding electrodes above and spaced from said pipe guide, means for wedging said electrodes toward each other, an electrode spaced beyond the ends of said welding electrodes, means for inducing alternating electric currents between opposite poles, means for connecting one of said poles to one of said welding electrodes, and a switch for alternatively connecting the other of said poles to the other of said welding electrodes or to said spaced electrode.

In witness whereof I have hereunto signed my name.

THOMAS E. MURRAY, Jr.